United States Patent
Schlaerth, Jr.

(10) Patent No.: US 10,618,638 B2
(45) Date of Patent: Apr. 14, 2020

(54) SHOCKWAVE MITIGATION SYSTEM FOR SUPERSONIC AIRCRAFT

(71) Applicant: John B. Schlaerth, Jr., Redondo Beach, CA (US)

(72) Inventor: John B. Schlaerth, Jr., Redondo Beach, CA (US)

(73) Assignee: NCTAR, LLC, Arcadia, CA (US)

( * ) Notice: Subject to any disclaimer, the term of this patent is extended or adjusted under 35 U.S.C. 154(b) by 663 days.

(21) Appl. No.: 15/272,908

(22) Filed: Sep. 22, 2016

(65) Prior Publication Data

US 2018/0001996 A1 Jan. 4, 2018

Related U.S. Application Data

(60) Provisional application No. 62/222,074, filed on Sep. 22, 2015.

(51) Int. Cl.
| | | |
|---|---|---|
| *B64C 23/00* | (2006.01) | |
| *B64C 30/00* | (2006.01) | |
| *B64D 27/18* | (2006.01) | |
| *B64C 3/16* | (2006.01) | |
| *B64C 3/38* | (2006.01) | |
| *B64D 33/04* | (2006.01) | |

(52) U.S. Cl.
CPC ............... *B64C 23/00* (2013.01); *B64C 3/16* (2013.01); *B64C 3/38* (2013.01); *B64C 30/00* (2013.01); *B64D 27/18* (2013.01); *B64D 33/04* (2013.01)

(58) Field of Classification Search
CPC ........... B64C 23/00; B64C 3/38; B64C 30/00; B64D 27/18
See application file for complete search history.

(56) References Cited

U.S. PATENT DOCUMENTS

| | | | | |
|---|---|---|---|---|
| 2,950,879 A |   | 8/1960 | Smith | |
| 3,596,852 A | * | 8/1971 | Wakefield | B64C 30/00 |
| | | | | 239/265.13 |
| 3,737,119 A | * | 6/1973 | Cheng | B64C 23/04 |
| | | | | 244/1 N |
| 3,904,151 A | * | 9/1975 | Rethorst | B64C 23/065 |
| | | | | 244/204.1 |
| 4,008,866 A | * | 2/1977 | Rethorst | B64C 23/06 |
| | | | | 244/1 N |
| 4,168,044 A | * | 9/1979 | Rethorst | B64C 23/06 |
| | | | | 244/1 N |

(Continued)

OTHER PUBLICATIONS

Castner, Raymond S.; Elmiligui, Alaa; and Cliff, Susan, Exhaust Nozzle Plume and Shock Wave Interaction, National Aeronautics and Space Administration, Jan. 2, 2013, publication date: Feb. 1, 2013; pp. 1-28. Available electronically at http://www.sti.nasa.gov. website printout: Aug. 24, 2016.

(Continued)

*Primary Examiner* — Brian M O'Hara
*Assistant Examiner* — Keith L Dixon
(74) *Attorney, Agent, or Firm* — James K. Dawson

(57) ABSTRACT

A method of supersonic thrust generation includes generating a thrust supersonic exhaust plume having a first average velocity from an engine, and expelling a bypass exhaust plume having a second average velocity from the engine, the first average velocity greater than the second average velocity, so that the bypass exhaust plume inhibits coalescence of an engine exhaust plume compression shockwave.

9 Claims, 6 Drawing Sheets

(56) References Cited

U.S. PATENT DOCUMENTS

| | | | |
|---|---|---|---|
| 4,598,886 A | | 7/1986 | Friebel et al. |
| 5,251,846 A | * | 10/1993 | Rethorst .................. B64C 3/14 |
| | | | 244/1 N |
| 5,358,156 A | | 10/1994 | Rethorst |
| 5,934,607 A | * | 8/1999 | Rising ..................... B64C 23/04 |
| | | | 244/1 N |
| 7,861,966 B2 | * | 1/2011 | Rethorst ................. B64C 30/00 |
| | | | 244/1 N |
| 2010/0043389 A1 | | 2/2010 | Conners |

OTHER PUBLICATIONS

Fixing the Sound Barrier Three Generations of U.S. Research into Sonic Boom Reduction . . . and what it means to the future Presented at the FAA Public Meeting on Sonic Boom; publication date: Jul. 14, 2011; pp. 1-25.

Stitt, Leonard E., Exhaust Nozzles for Propulsion Systems With Emphasis on Supersonic Cruise Aircraft, NASA Reference Publication 1235, publication date: May 1990. pp. 1-107.

International Search Report for PCT Serial No. PCT/USI7/53006, dated Mar. 9, 2018.

* cited by examiner

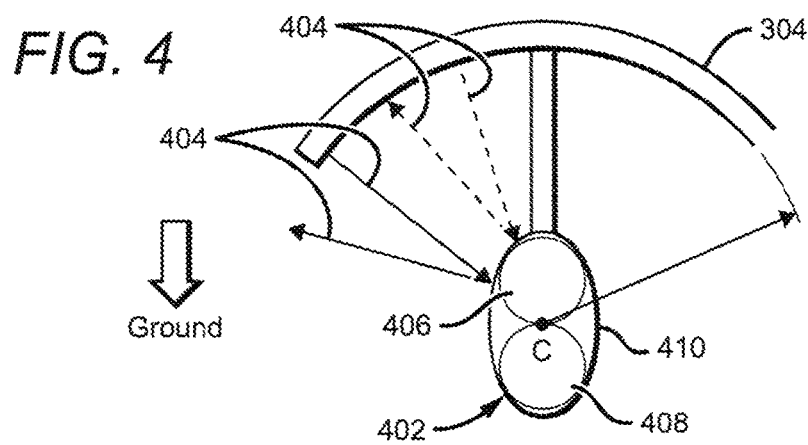
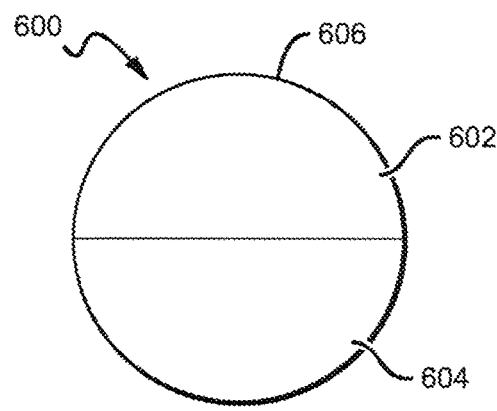
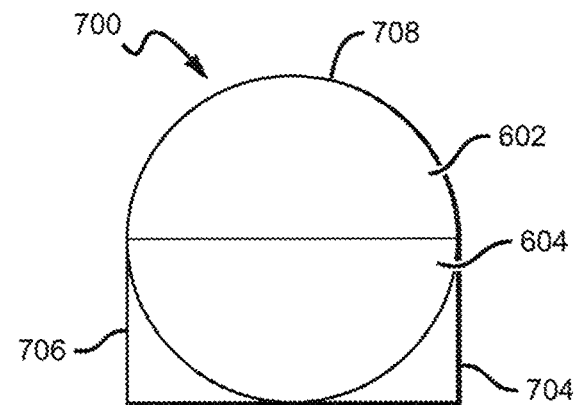
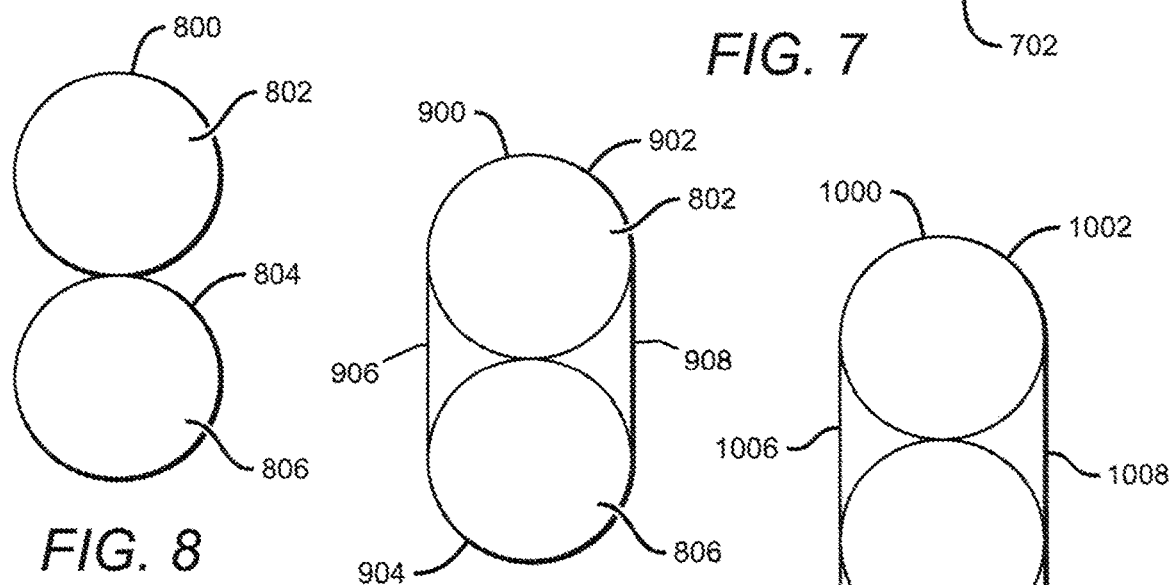

SHOCKWAVE MITIGATION SYSTEM FOR SUPERSONIC AIRCRAFT

CROSS-REFERENCE TO RELATED APPLICATIONS

This application claims priority to and the benefit of U.S. Provisional Patent Application No. 62/222,074 filed Sep. 22, 2015, the contents of which are incorporated by reference herein for all purposes.

BACKGROUND

Field of the Invention

The field of the invention relates to supersonic aircraft structures, and more particularly systems to mitigate sonic ground effects of such aircraft.

Description of the Related Art

Government agencies administer policies on noise limits for civil supersonic aircraft that are intended to protect the public from excessive and environmentally damaging noise pollution caused by earthward propagating compression shockwaves (i.e., sonic booms) from such aircraft. For example, since March 1973, supersonic flight over land by civil aircraft has been prohibited in the United States. Past efforts at mitigating such sonic booms include attempts at re-shaping or reducing the peak intensity of such compression shockwaves impacting at ground level, such as Gulfstream's "spike" that transforms the traditional N-wave sonic boom into a smooth and more rounded pressure wave shaped roughly like a sine wave or sideways "S". (*Federal Register*/Vol. 76, No. 100/Tuesday, May 24, 2011/Notices P. 30231).

There has been a long and unmet need for civil supersonic air transportation in many countries. The National Aeronautics and Space Administration in the United States projects that supersonic flight over land may result in a 50% reduction in cross country travel time, facilitate movement of time-critical cargo, including life-saving medical supplies, and enhance homeland security through rapid transportation of critical responder teams. (*Fixing the Sound Barrier Three Generations of U.S. Research into Sonic Boom Reduction . . . and what it means to the future*. FAA Public Meeting on Sonic Boom. Jul. 14, 2011 (http://www.faa.gov/about/office_org/headquarters_offices/apl/noise_emissions/supersonic_aircraft_noise/media/NASA%20Presentation.pdf, accessed Sep. 16, 2016) Without significant reduction in compression shockwave energy received at ground level, supersonic flight by civil aircraft over land will not become a reality in most countries.

A need continues to exist to reduce the peak intensity of sonic booms reaching the ground, or to eliminate them entirely, for aircraft flying greater than the speed of sound.

SUMMARY

A method of shock wave mitigation in supersonic vehicles may include generating an earthward propagating wing compression shockwave from a curved wing, expelling a first supersonic exhaust plume having a first average velocity from an engine, the engine having an engine housing, reflecting a majority of the earthward propagating wing compression shockwave back towards the curved wing using the engine (see below for engine casing reflection vs. thrust reflection), expelling a bypass exhaust plume having a second average velocity adjacent to the first supersonic exhaust plume, the second average velocity being slower than the first average velocity, and inhibiting coalescence of an engine exhaust plume compression shockwave extending from the first supersonic exhaust plume using the bypass exhaust plume. The step of reflecting a majority of the earthward propagating wing compression shockwave back towards the curved wing using the engine may further include reflecting the wing compression shockwave off of the engine housing. The method may also include moving the engine housing to meet the wing compression shockwave, and the step of moving the engine housing may include translating the engine along the axis of freestream air flow about the engine. In some embodiments, the method may include slidably moving the wing relative to a fuselage that is itself slidably coupled to the wing so that the wing compression shockwave is moved relative to the engine to meet the engine housing for reflection. In other embodiments, reflecting a majority of the wing compression shockwave back away from the earth may also include reflecting the wing compression shockwave off of the first supersonic exhaust plume. The reflection of the wing compression shockwave off of the first supersonic exhaust plume may establish an upward propagating reflected compression shockwave. The second average velocity (of the bypass exhaust plume) may be approximately the same velocity as a freestream velocity about the wing. In certain embodiments, the bypass exhaust plume is expelled from the engine, and the bypass exhaust plume may include air sourced from (i) bleed air taps from a compressor in the engine or (ii) bleed air taps at inlet shock ramps disposed at a front of the engine. In certain embodiments of the engine, the engine may have a first nozzle expelling the first supersonic exhaust plume and a second nozzle expelling a bypass exhaust plume that has an average velocity that is slower than an average velocity of the first supersonic exhaust plume. The wing may have a bottom surface shape configured to direct the compression shockwave toward the engine. The step of generating a downward propagating wing compression shockwave from the curved wing towards the earth may include propagating a majority or substantially all of the compression shockwave toward a rear portion of the engine housing. In other embodiments, generating a downward propagating wing compression shockwave from the curved wing towards the earth comprises propagating substantially all of the compression shockwave toward the first supersonic exhaust plume. The curved wing may have an outboard portion shape that is straight or upward curving so that a high-pressure underwing to freestream low pressure interface channels a sound propagating vector that is at an inclination to the ground and parallel to the ground, respectively. The engine may be selected from the group consisting of a jet engine, turbojet engine, ramjet engine, scramjet engine, high bypass turbojet, variable cycle engine, and adaptive-cycle engine. In other embodiments, less than the entire wing compression shockwave is reflected back towards the curved wing using the engine.

A method of supersonic thrust generation includes generating a thrust supersonic exhaust plume having a first average velocity from an engine, and expelling a bypass exhaust plume having a second average velocity from the engine, the first average velocity greater than the second average velocity. The thrust supersonic exhaust plume and bypass exhaust plume may be substantially aligned when exiting the engine. The bypass exhaust plume may be generated from a source selected from the group consisting of (i) bleed air taps from a compressor in the engine, (ii) bleed air taps at inlet shock ramps disposed at a front of the engine.

An air vehicle may include a fuselage, an engine comprising an exhaust plume nozzle, a bypass plume nozzle disposed adjacent to the exhaust plume nozzle, and a curved supersonic wing coupled to the fuselage, the curved supersonic wing curving about the engine. The engine may also include the bypass plume nozzle rather than apart from the engine. The engine may be translatable in relation to the curved supersonic wing. In an alternative embodiment, the curved supersonic wing may be translatable in relation to the engine. The air vehicle may also include an engine casing disposed on the engine, the engine have a wing-facing curved portion that has a center of radius that substantially coincides with a center of radius of an underside of the curved supersonic wing. A plurality of control surfaces may also be included, the control surfaces not operable to extend downwards during supersonic flight. In other embodiments, an engine casing is coupled to the engine, the engine casing having a flat bottom portion that is in a plane parallel to freestream air flow when such freestream air flow is greater than Mach 1 during flight. The engine may be operable to provide supersonic thrust through the exhaust plume nozzle that has an average supersonic velocity that is greater than a supersonic velocity provided through the bypass plume nozzle.

A method of shock wave mitigation in supersonic vehicles may include generating an earthward propagating wing compression wave region from a curved wing, expelling a first supersonic exhaust plume having a first average velocity from an engine, the engine having an engine housing, and translating the engine to expel the first supersonic exhaust plume immediately upstream from the earthward propagating wing compression wave region, wherein the earthward propagating wing compression wave region is inhibited from coalescing into a compression shockwave by the first supersonic exhaust plume. The method may also include expelling a bypass exhaust plume having a second average velocity adjacent to the first supersonic exhaust plume, the second average velocity of the bypass exhaust plume being slower than the first average velocity of the first supersonic exhaust plume, and inhibiting coalescence of an engine exhaust plume compression shockwave extending from the first supersonic exhaust plume using the bypass exhaust plume.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIGS. 3 and 4 are rear plan views illustrating two implementations of a bifurcated exhaust engine;

FIGS. 6-10 are rear plan views illustrating alternative implementations of a bifurcated exhaust engine;

DETAILED DESCRIPTION

A bifurcated exhaust engine and wing configuration are disclosed that are operable to inhibit coalescence of any supersonic exhaust plume compression shockwave and that are capable of reflecting an earthward propagating wing compression shockwave back up and away from the ground to eliminate or substantially reduce transmission of sonic booms to ground level for aircraft flying greater than the speed of sound.

Figure 1:
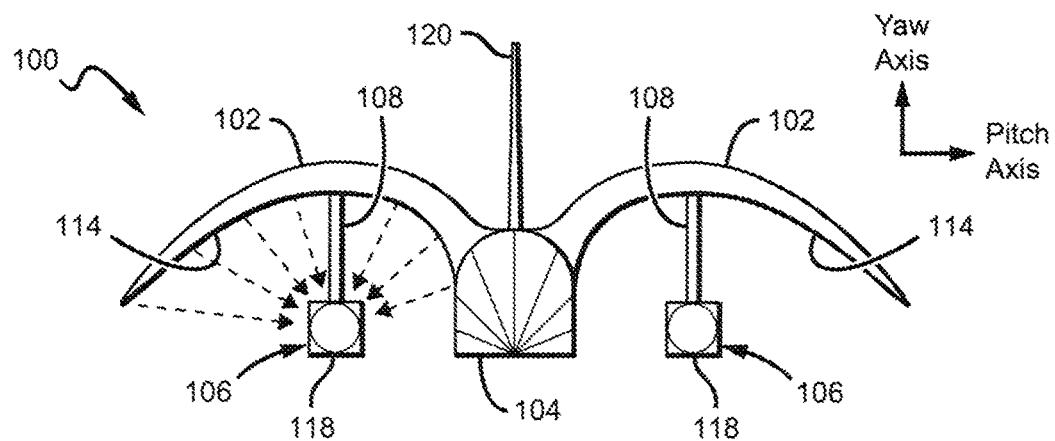
FIGS. 1 and 2 are front and top plan reviews, respectively, of one embodiment of a supersonic aircraft having two curved wings to direct earthward propagating wing compression waves to respective bifurcated exhaust engines for compression wave mitigation.
Figure 2:
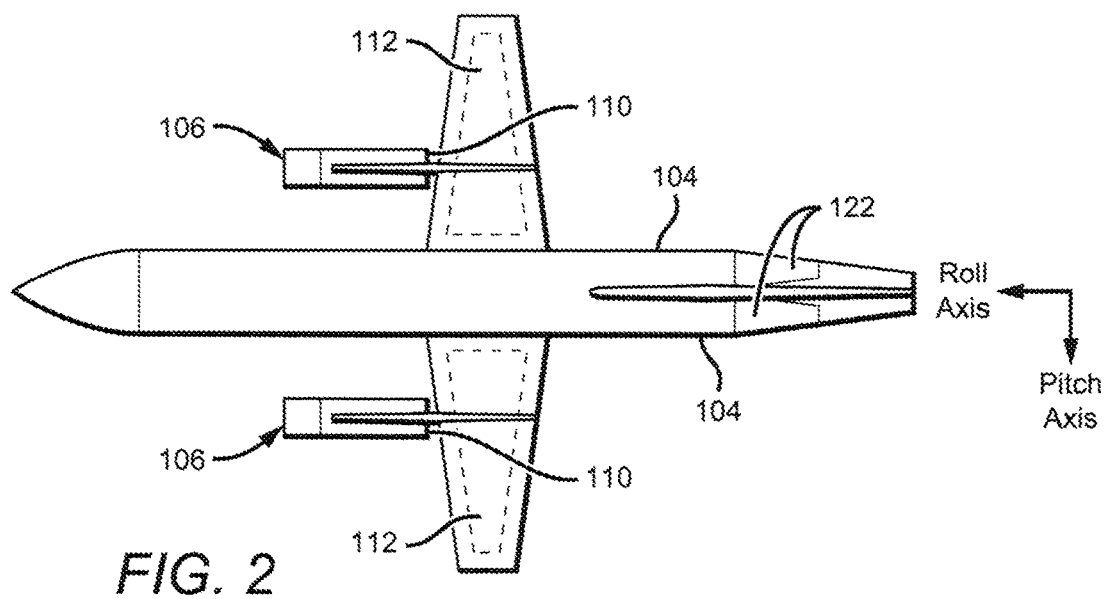

FIGS. 1 and 2 are front and top plan reviews, respectively, of a supersonic aircraft having a fuselage coupled between two curved supersonic wings, and respective engines that are positioned to intercept and reflect earthward propagating wing compression shockwaves, with the engines also designed to mitigate exhaust plume compression shockwaves. Each of the curved supersonic wings 102 may be attached to the fuselage 104 in a high-wing configuration, with each engine 106 connected underneath to its respective wing 102 through an engine pylon 108 to provide supersonic thrust for propulsion of the supersonic aircraft 100. Each engine 106 may be positioned with an engine outlet 110 terminating in front of a respective wing compressive lift shock region 112 that provides lift to the curved wing 102 during supersonic flight. Each engine 106 is preferably slidably coupled to its respective curved supersonic wing 102 to enable roll axis linear translation from a fore engine position to an aft engine position (see FIGS. 11 and 12). In an alternative environment, each engine 106 is capable of two-dimensional translational movement, such as a linear translation along the roll axis and along the yaw axis. Such capability would allow each engine outlet 110 (otherwise referred to as "nozzles"), to move closer to or further away from its adjacent wing compressive lift shock region 112, or closer to or further from the underside 114 of each respective wing 102. In an alternative embodiment, each engine 106 may be slidably coupled to the fuselage 104, rather than to the wing 102, to enable translation along the roll and or yaw axis of each engine 106 with respect to its associated wing 102. An engine casing 118 may be slidably or fixedly coupled to the engine 106 and disposed on and encompassing a rear portion of each engine 106. The engine casings 118 may each have a wing-facing curved portion for receipt of an earthward propagating wing compression shockwave (indicated by dashed arrows). In one embodiment, each engine casing 118 has a center of radius $R_H$ having a center point C that substantially coincides with a center point C of a radius $R_W$ of an underside of the curved supersonic wing 102.

Each of the curved supersonic wings 102 may be formed in a curved anhedral or curved dihedral spanwise configuration, with the engines 106 generally centered at a respective center of radius for each of the curved lower surfaces of the wings. During supersonic flight, each curved wing 102 generates an earthward propagating wing compression shockwave that is directed toward an aft portion of its associated engine casing 118 or its associated supersonic exhaust plume (see FIG. 5). In embodiments using engines 106 that are operable to translate fore and aft, the engines 106 may translate to more closely match movement of the earthward propagating wing compression shockwave as it translates with varied supersonic aircraft speeds. In further embodiments, the wings 102 may be slidably coupled to the fuselage 104 to enable variable displacement between the engines 106 and respective wings 102 should the earthward propagating wing compression shockwave translate fore or aft with aircraft speed. The wing planforms may be rectangular or delta or may consist of another planform deemed desirable for supersonic flight.

In the illustrated embodiment, the supersonic aircraft has a vertical stabilizer 120 and two aft mounted control surfaces 122 for pitch and roll control. The control surfaces 122 are not operable to extend downwards during supersonic flight so as to avoid additional earthward propagating compression shockwaves. The fuselage 104 is flat-bottomed and configured with the two wings 102 to be parallel to the freestream air flow during supersonic flight to reduce the possibility of unintended compression shockwave formation propagating earthward during upright flight.

Figure 3:
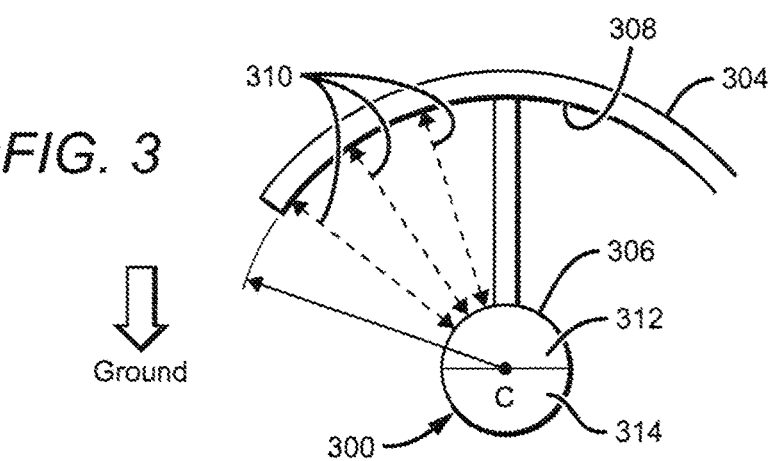

FIGS. 3 and 4 are rear plan views illustrating two implementations of a bifurcated exhaust engine having an engine casing positioned to receive an earthward propagating wing compression shockwave from a curved supersonic wing 102. The engines (300, 402) may be located at approximately a center of radius C of the underside of the curved supersonic wing 304. In FIG. 3, an outer surface of the engine casing 306 is substantially cylindrical at the anticipated point of reflection of the wing compression shockwave, and is configured in complementary opposition to an underside 308 of the curved wing 102 such that an earthward propagating wing compression shockwave 310 emanating from the curved wing 102 is reflected by the engine casing 306 back to the curved wing 304 within the illustrated plane of the figure. In FIG. 4, an engine casing 402 does not have a spherical upper surface and so not all of an earthward propagating wing compression shockwave 404 is reflected back to the curved wing 304. However, the engine casing 402 is shaped at the anticipated point of reflection such that a majority of the shockwave is reflected back towards the curved wing 304 (i.e., using the engine) and substantially none of the shockwave is directed towards the ground during level flight of the aircraft.

High speed and low speed engine exhaust regions may be provided in the bifurcated exhaust engine, with an upper exhaust plume nozzle (312, 406) providing the high speed exhaust region and the adjacent lower bypass plume nozzle (314, 408) providing the low speed engine exhaust region. As used herein, "high speed" and "low speed" are intended to indicate relative speed between them, rather than absolute speed values. For example, a high speed average flow exiting the upper exhaust plume nozzle may be Mach 1.0-4.0, while a "low speed" average flow exiting lower bypass plume nozzle may be Mach 0.9-2.5, so long as the high speed average velocity is higher than the low speed average velocity at any point in time. As used herein, "higher" and "lower" are also relative positions having a reference frame of an aircraft that is upright and relatively level with respect to the Ground. In FIG. 3, the engine casing has a substantially circular cross section and is parallel to the free stream at an anticipated area of reflection of the wing compression shockwave 310 to provide more complete reflection back to the curved wing 102. Each of the high and low speed exhaust plume nozzles (312, 314) may be truncated at their exit planes and not wholly circular, such as to form semicircles at their exit planes. In FIG. 4, each of the high and low speed exhaust plume nozzles (406, 408) are substantially circular at their exit planes and the engine casing 410 may be substantially ellipsoid and parallel to the free stream at the anticipated area of shockwave reflection.

Figure 5:
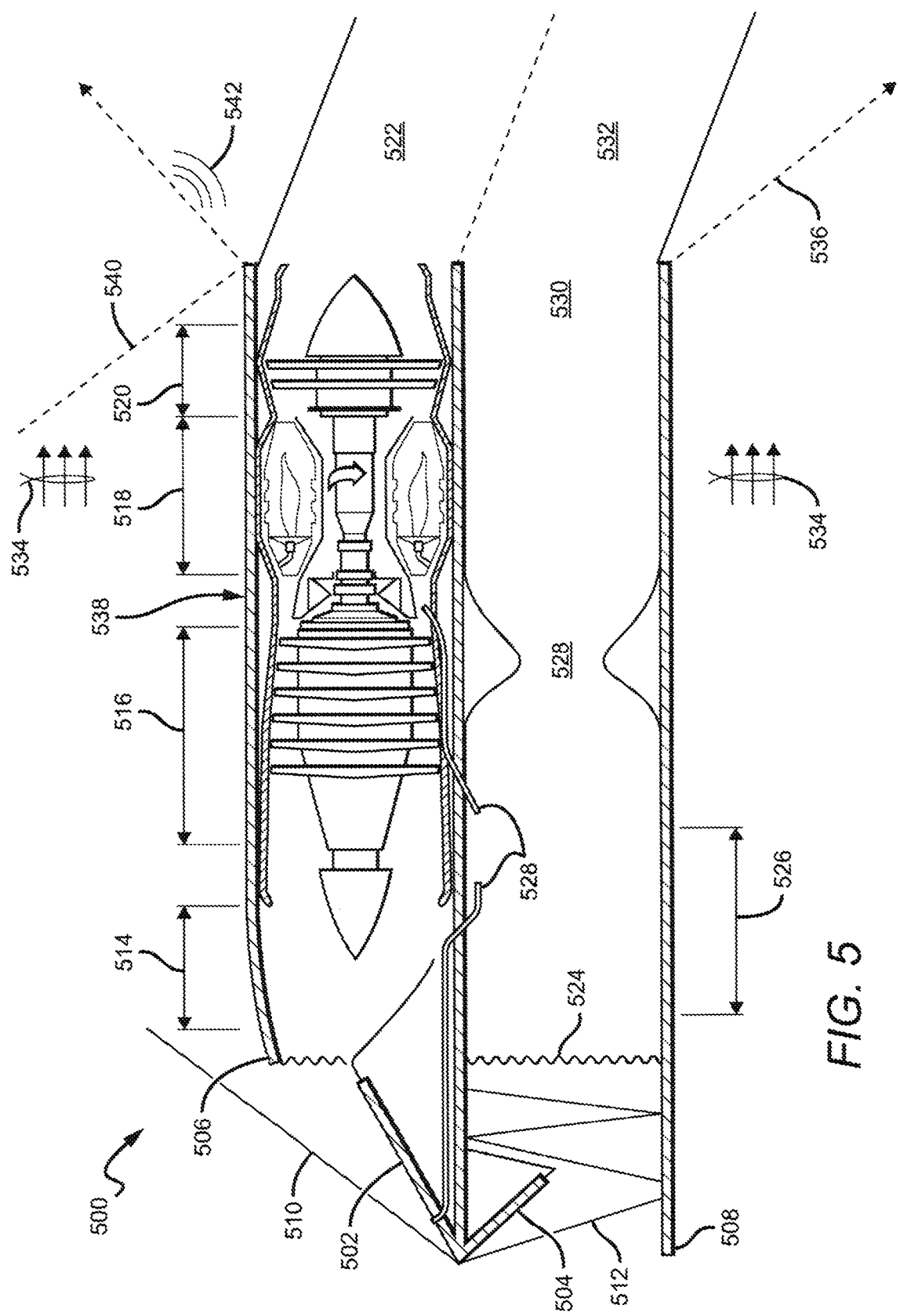
FIG. 5 illustrates one embodiment of a bifurcated exhaust engine having a single turbojet engine and using a bypass exhaust plume to inhibit coalescence of an engine exhaust plume compression shockwave.

FIG. 5 depicts a bifurcated exhaust engine that expels a bypass exhaust plume to inhibit coalescence of an engine exhaust plume compression shockwave, and to reflect an earthward propagating wing compression shockwave that is reflected off an engine housing of the bifurcated engine. The engine, illustrated as a turbojet engine 500, may have an inlet cone or dual inlet ramps (502, 504) that may be disposed in front of and between an upper thrust air intake 506 and lower bypass air intake 508. Upper and lower oblique shock waves (510, 512) may form at the dual inlet ramps (502, 504) at free stream air speeds of greater than Mach 1. The upper thrust air intake 506 leads to a subsonic diffuser section 514 that delivers subsonic air to a compression section 516, with the compressed air then delivered to a combustion chamber 518 for mixing with a fuel, combustion, and hence to a turbine section 520 for expansion of the resultant gases out of a nozzle section to expel a supersonic exhaust plume 522.

The lower oblique shockwave 512 may be reflected internally within the lower bypass air intake 508 before producing a normal shockwave 524 immediately in front of a subsonic flow region 526. The subsonic flow region 526 receives the resulting high-pressure air. Bleed air may be provided to the subsonic flow region 526, such as from bleed air taps 528 leading from the compression section 516, from the inlet shock ramps (502, 504), or from the upper supersonic exhaust plume 522 (before it exits its respective nozzle) using direct ducting of the exhaust that has been slowed to 'near free stream' velocity. The high-pressured air may then be presented to a bypass throat 528 for expulsion from a second nozzle section 530 as a bypass exhaust plume 532, with the second nozzle section 530. The bypass exhaust plume 532 has an average speed that is slower than the supersonic speed of the supersonic exhaust plume 522. Although the actual velocity of the bypass exhaust plume 532 may be greater than, equal to, or less than Mach 1.0 when expelled from the second nozzle, its relative velocity to the free stream 534 is subsonic (M<1.0) to avoid transmittal shock to the free stream 534 upon contact with it during supersonic flight. A shockwave front 536 that would otherwise exist from the supersonic exhaust plume 522 is abated in response to freestream contact with the bypass exhaust plume 532.

The engine 500 may have an engine housing 538 having a top cylindrical surface or otherwise curved exterior surface that is parallel to the free stream air 534 to prevent generation of a compression shock wave. An earthward propagating wing compression shockwave 540 is illustrated extending down and reflecting off of the engine housing 538 during normal flight to reflect a majority, or as illustrated, "all," of the earthward propagating wing compression shockwave 540 back towards the curved wing (see FIG. 1). The supersonic exhaust plume 522 is deflected down due to pressure 542 behind the reflected wing compression shockwave 540, with the deflected supersonic exhaust plume 522 causing a similar deflection downward of the bypass exhaust plume 532. Because the bypass exhaust plume 532 is at a relative velocity that is subsonic (M<1.0) with respect to the free stream 534, coalescence of an engine exhaust plume compression shockwave 536 is inhibited.

FIGS. 6-10 are rear plan views illustrating different embodiments of a bifurcated exhaust engine that may be used to inhibit coalescence of an engine exhaust plume compression shockwave, and to reflect an earthward propagating wing compression shockwave. More particularly, FIG. 6 illustrates a bifurcated exhaust engine 600 having an upper exhaust plume nozzle 602 and a lower bypass plume nozzle 604. The engine casing 606 encompassing both nozzles (600, 602) is substantially circular in cross section, with both the upper exhaust plume nozzle 602 and lower bypass plume nozzle 604 both having substantially a semicircular cross section at their exit planes. In another embodiment illustrated in FIG. 7, the entirety of the engine casing 700 is not semicircular in cross section, but rather may form a flat lower portion such as a flat lower surface 702 underneath the lower bypass plume nozzle 604. The engine casing 700 may have sidewalls (704, 706) extending down from either side of the semi-circular upper surface 708. The upper exhaust plume nozzle 602 and lower bypass plume nozzle 604 may each have a semi-circular cross section as in FIG. 6. In FIG. 8, the engine casing may take the form of two separate engine casings, with the upper engine casing 800 encompassing the upper exhaust plume nozzle 802 and the lower engine casing 804 encompassing the lower bypass plume nozzle 806. In FIG. 9, the engine casing 900 has upper and lower semicircular exterior surfaces (902, 904) and side panels (906, 908) extending between the upper and lower semicircular exterior surfaces (902, 904) and encompassing the upper exhaust plume nozzle 802 and lower bypass plume nozzle 806. In FIG. 10, the engine casing 1000 may have a semicircular upper reflecting surface 1002, a flat lower surface 1004 and side panels (1006, 1008) encompassing the upper exhaust plume and lower bypass plume nozzles.

It may be understood that the described engine casings need not have the same cross section in the longitudinal direction (i.e., in the fore-to-aft aircraft dimension). Rather, the outer engine casing may have a shape that maintains an upper and lower orientation of the exhaust plume nozzle and a lower bypass plume nozzle, respectively, and may maintain a pre-determined upper reflecting surface at the anticipated area of compression shockwave reflection. Also, although the engine casings are illustrated as substantially semicircular or circular, they may be formed in other shapes, including elliptical and rectangular, and may be independent from the supersonic nozzle shape. For example, the engine casings illustrated in FIGS. 6-10 may each encompass bell-shaped nozzles, plug nozzles, variable flap ejector nozzles, aerospike engines, expanding nozzles or other nozzles that accomplish the task of supersonic flight with the low speed engine exhaust region having a relative subsonic velocity with the free stream.

Figure 11:
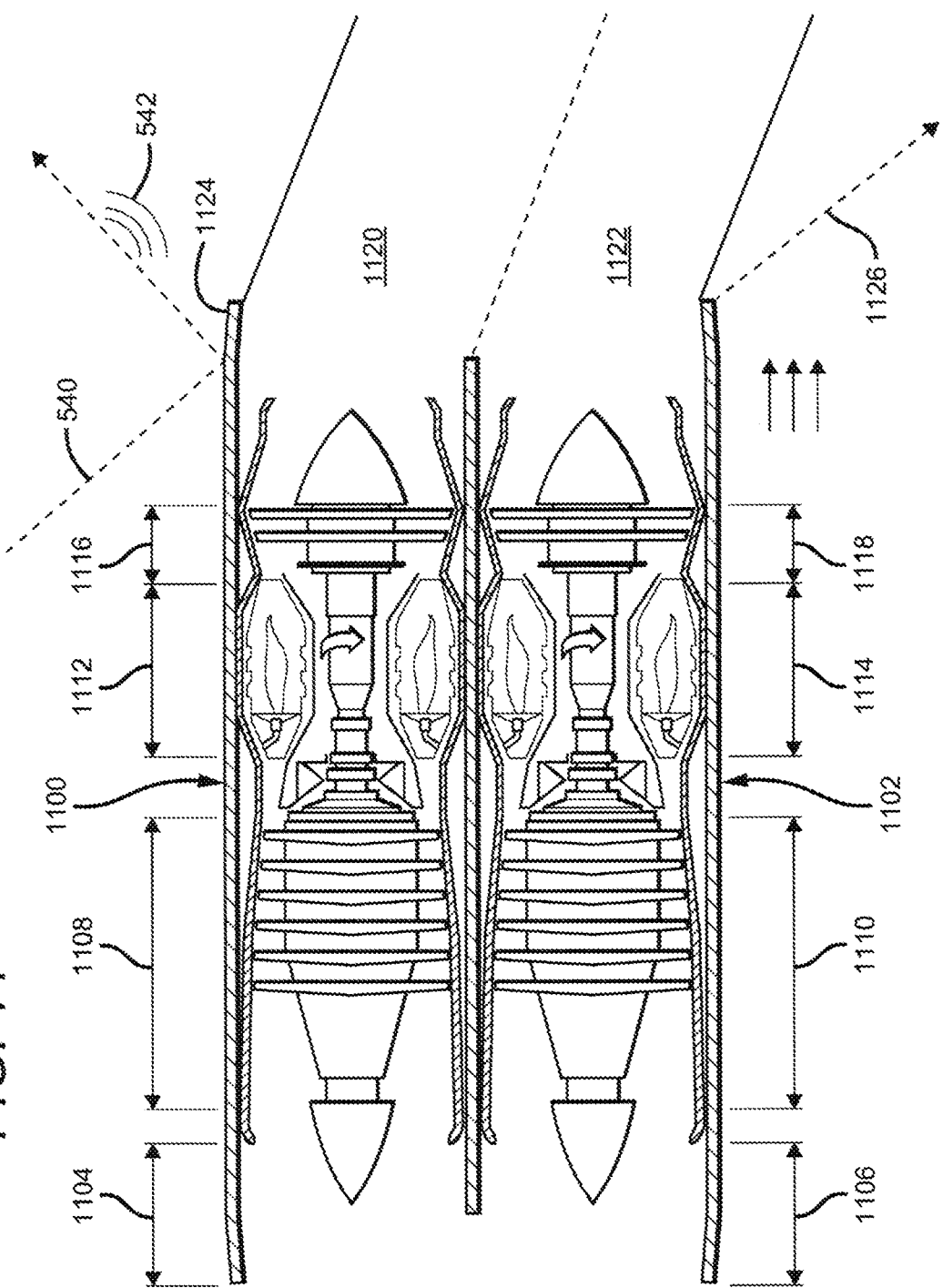
FIG. 11 illustrates another embodiments of a bifurcated exhaust engine having two turbojet engines and using a bypass exhaust plume to inhibit coalescence of an engine exhaust plume compression shockwave

FIG. 11 depicts a bifurcated exhaust engine that has upper and lower engines producing an upper thrust exhaust plume and lower bypass exhaust plume, respectively, with the lower bypass exhaust plume having an average velocity that is subsonic relative to a free stream. In one embodiment, the engines are upper and lower turbojet engines (1100, 1102). Upper and lower subsonic diffuser sections (1104, 1106) deliver subsonic air to respective compression sections (1108, 1110), with the compressed air then delivered to respective combustion chambers (1112, 1114) for mixing with a fuel, combustion, and hence to respective turbine sections (1116, 1118) for expansion of the resultant gases resulting in an upper supersonic exhaust plume 1120 and bypass exhaust plume 1122. With such a configuration, bleed air may not be collected from bleed air taps, but rather the bypass exhaust plume is generated from the lower turbojet engine 1102 itself. Similar to the embodiment illustrated in FIG. 5, an earthward propagating wing compression shockwave 540 is illustrated extending down and reflecting off of the engine housing 1124 during normal flight to reflect a majority, or as illustrated, "all," of the earthward propagating wing compression shockwave 540 back towards the curved wing (see FIG. 1). The supersonic exhaust plume 1120 is deflected down due to pressure 542 behind the reflected wing compression shockwave 540, with the deflected supersonic exhaust plume 1120 causing a similar deflection downward of the bypass exhaust plume 1122 to inhibit coalescence of an engine exhaust plume compression shockwave 1126 that would extend from the first supersonic exhaust plume.

Figure 12:
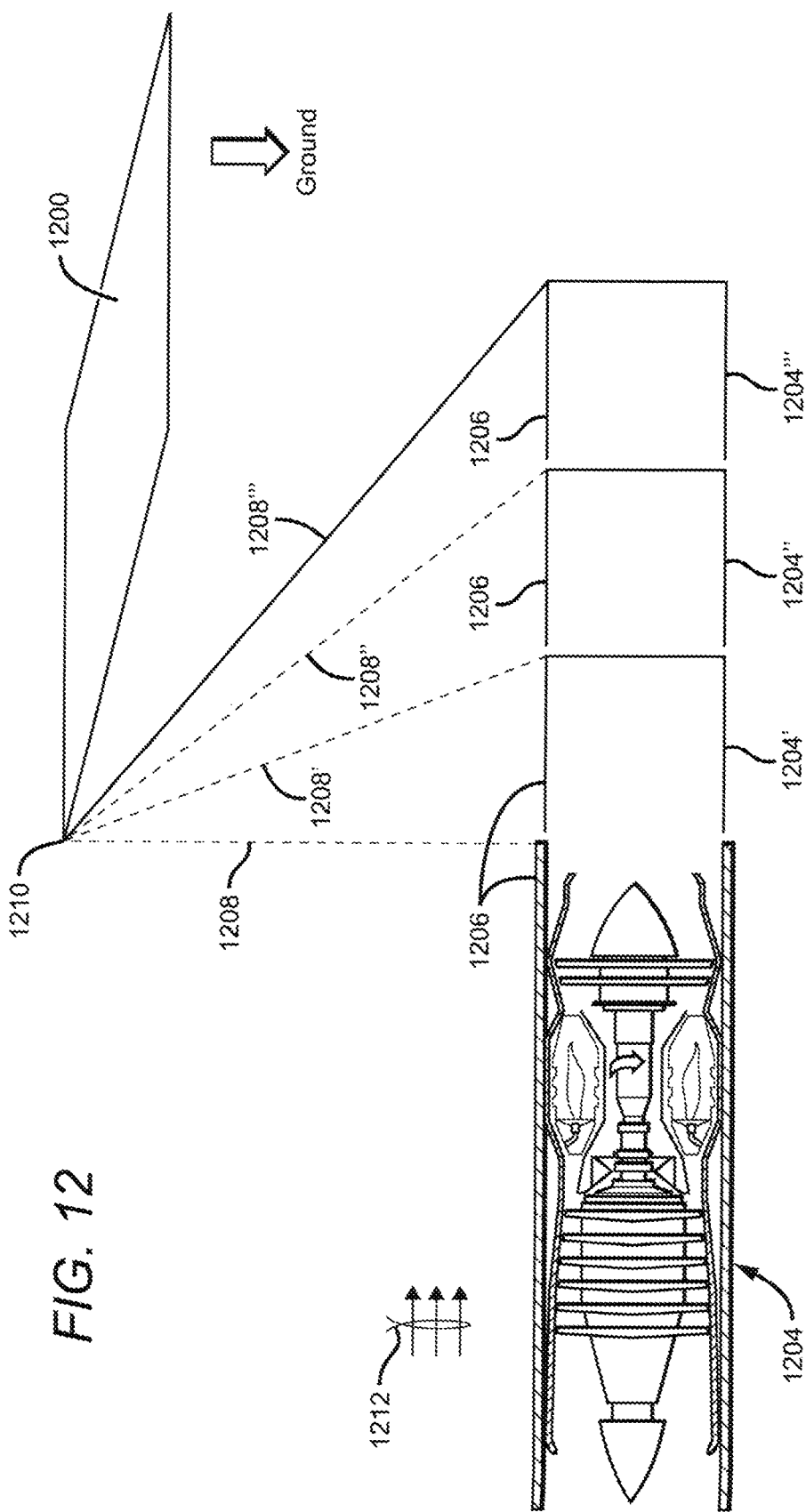
FIG. 12 illustrates an engine that is operable to translate in relation to a supersonic wing to enable reflection of an earthward propagating wing compression shockwave back up and away from ground.
Figure 13:
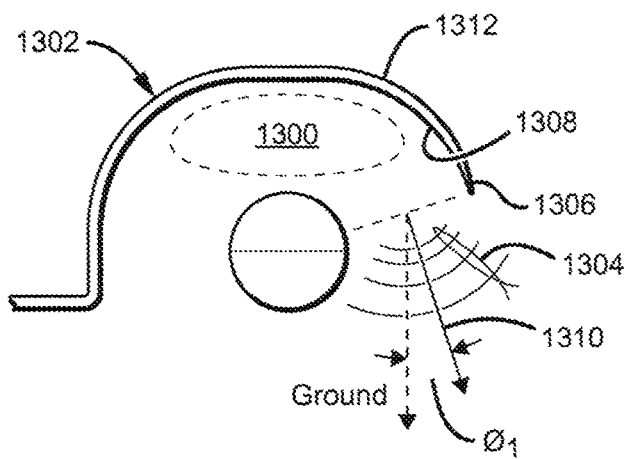
FIGS. 13, 14 and 15 illustrate different embodiments of a curved wing and bifurcated engine, with respective wings having concave, straight and convex outboard wing portions.

FIGS. 12 and 13 illustrate a side plan view of an engine that is operable to translate along the axis of freestream air flow to meet a wing compression shockwave for subsequent reflection back up and away from ground. A supersonic wing 1200 and engine, such as a turbojet engine 1204, are configured to be movable in relation to one another. For example, the supersonic wing 1200 and turbojet engine 1204 may be slidably coupled together, such as through an engine pylon with a sliding mechanism. In other embodiments, the turbojet engine 1204 may be slidably coupled to a fuselage (not shown) that is itself fixedly coupled to the wing 1200, or the wing 1200 may be slidably coupled to the fuselage with the fuselage fixedly coupled to the turbojet engine 1204. In any of the described configurations, an engine casing 1206 encompassing at least a portion of the turbojet engine 1204 is illustrated initially positioned in a fore position to intercept an earthward propagating wing compression shockwave 1208 extending from the supersonic wing 1200. The earthward propagating wing compression shockwave 1208 is illustrated as extending approximately perpendicularly from a leading edge 1210 of the supersonic wing 1200 relative to a free stream supersonic flow 1212 having a first velocity, such as Mach 1.0. As a speed of the free stream supersonic flow 1212 increases, such as approaching Mach 1.4, the earthward propagating wing compression shockwave 1208' may begin to extend back from perpendicular and away from the turbojet engine 1204. In one embodiment, the turbojet engine 1204 may be linearly translated to position 1204' concurrently with rearward movement of the shockwave 1208' so that the earthward propagating wing compression shockwave 1208' continues to impinge on the engine casing 1206 for reflection. Similarly, as the free stream airflow continues to increase in velocity, such as to Mach 1.8 and onward to Mach 2.2, the position of the earthward propagating wing compression shockwave may continue to move (1208", 1208''') and the turbojet engine 1204 translated concurrently to intermediate position 1204" and aft position 1204''', respectively, to enable all or nearly all of the earthward propagating wing compression shockwave to reflect off of the engine casing 1206. In other embodiments, the turbojet engine is a bifurcated exhaust engine and the bifurcated exhaust engine is translated in accordance with the scheme described, above.

In an alternative embodiment, the engine casing 1206 or other outer surface is operable to translate independently, or in addition to, translation of the engine 1204 to meet the earthward propagating wing compression shockwave. In such an embodiment, reference numerals 1204', 1204" and 1204''' may represent only the engine casing 1206 or other outer surface, and a majority of the engine 1204 may remain substantially fixed to the wing or fuselage. For example, the wing 1200 may remain fixed with respect to the engine 1206, but the engine casing 1206 may extend along the axis of freestream air flow to meet the shockwave (1208, 1208', 1208", 1208''') for subsequent reflection back up and away from ground. In a further embodiment, the engine 1204 moves with respect to the wing 1200 and the engine casing (or other outer surface) is operable to move with respect to the engine 1204 to extend along the axis of freestream air flow to enable the engine casing (or other outer surface) to meet the earthward propagating wing compression shockwave. Such translation capability of the engine 1204 and/or engine casing 1206 may enable to expulsion of the first supersonic exhaust plume immediately upstream from the earthward propagating wing compression wave region to eliminate or substantially reduce transmission of sonic booms to ground level for aircraft flying greater than the speed of sound.

Figure 14:
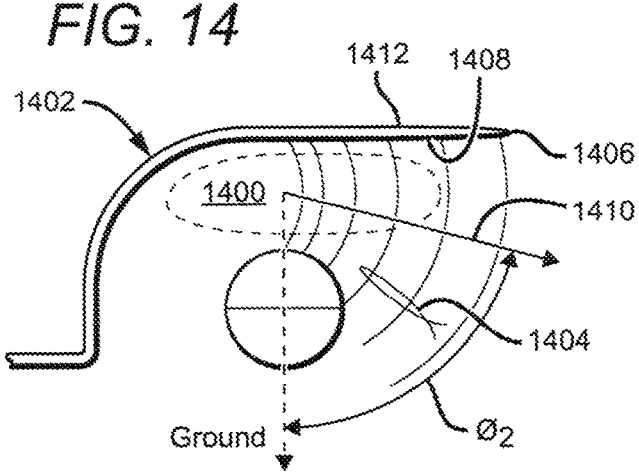
Figure 15:
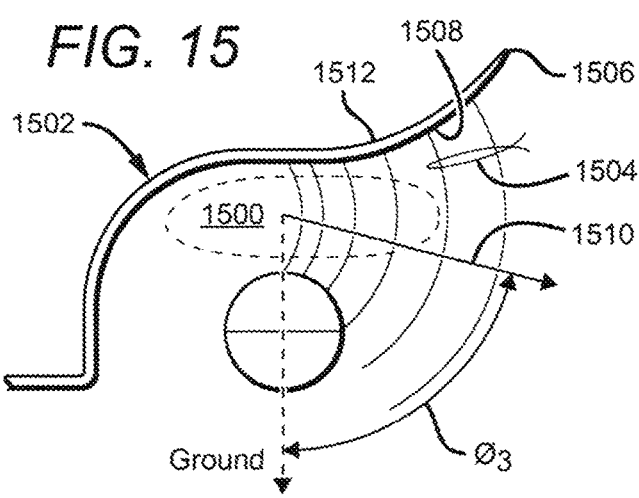

FIGS. 13, 14, and 15 are rear plan views illustrating starboard supersonic curved wings in a dihedral configuration, and associated engine nozzles, with the curved wings having outboard portion shapes that are concave, straight and convex (i.e., upward curving), respectively. During supersonic flight, high pressure areas (1300, 1400, 1500) may exist underneath respective curved wings (1302, 1402, 1502). Pressure gradients (1304, 1404, 1504) will develop that extend from such high pressure areas (1300, 1400, 1500) to the freestream adjacent wing tips (1306, 1406, 1506) of each wing. Such pressure gradients (1304, 1404, 1504) may not be sufficient to generate a compression shockwave perpendicular to the direction of flight. However, they may result in propagation of a resulting pressure wave, as guided by an underside (1308, 1408, 1508) of each respective wing, that is analogous to a megaphone directing sound. The sound will tend to fall off away from a centerline (1310, 1410, 1510) of such a pressure gradient. As illustrated in the different wing configurations of FIGS. 13-15, the centerline (otherwise referred to as a "datum line" or "sound propagating vector") may extend an angle (Ø) from ground during level flight depending on the configuration of the outboard wing portions. In FIG. 14, the straight outboard wing portion 1412 (indicated with dashed lines) serves to direct the datum line at an angle ($Ø_2$) to ground that is greater than the angle ($Ø_1$) generated by the convex outboard wing portion 1312 of FIG. 13. Similarly, in FIG. 15, the convex outboard wing portion 1512 may direct the datum line to an angle ($Ø_3$) that is approximately 90 degrees away from the ground. Less sound energy is received at ground level with increasing angle (Ø). The resulting high-pressure underwing to freestream low pressure interfaces (1404, 1504) illustrated in FIGS. 14 and 15 channel their respective sound propagating vectors (1410, 1510) at an inclination to the ground and parallel to the ground, respectively.

While various embodiments have been described, it will be apparent to those of ordinary skill in the art that many more embodiments and implementations are possible that are within the scope of this invention.

What is claimed is:

1. A method of shock wave mitigation in supersonic vehicles, comprising:
   generating an earthward propagating wing compression shockwave from a curved wing;
   expelling a first supersonic exhaust plume having a first average velocity from an engine, the engine having an engine housing;
   reflecting a majority of the earthward propagating wing compression shockwave back towards the curved wing using the engine;
   expelling a bypass exhaust plume having a second average velocity adjacent to the first supersonic exhaust plume, the second average velocity being slower than the first average velocity; and
   inhibiting coalescence of an engine exhaust plume compression shockwave extending from the first supersonic exhaust plume using the bypass exhaust plume;
   wherein the step of reflecting a majority of the earthward propagating wing compression shockwave back towards the curved wing using the engine further comprises reflecting the wing compression shockwave off of the engine housing.

2. The method of claim 1, further comprising moving the engine housing to meet the wing compression shockwave.

3. The method of claim 2, wherein the step of moving the engine housing comprises translating the engine along the axis of freestream air flow about the engine.

4. The method of claim 1, further comprising:
   slidably moving the wing relative to a fuselage slidably coupled to the wing;
   wherein the wing compression shockwave is moved relative to the engine to meet the engine housing.

5. A method of shock wave mitigation in supersonic vehicles, comprising:
   generating an earthward propagating wing compression shockwave from a curved wing;
   expelling a first supersonic exhaust plume having a first average velocity from an engine, the engine having an engine housing;
   reflecting a majority of the earthward propagating wing compression shockwave back towards the curved wing using the engine;
   expelling a bypass exhaust plume having a second average velocity adjacent to the first supersonic exhaust plume, the second average velocity being slower than the first average velocity; and
   inhibiting coalescence of an engine exhaust plume compression shockwave extending from the first supersonic exhaust plume using the bypass exhaust plume
   wherein the engine has a first nozzle expelling the first supersonic exhaust plume and a second nozzle expelling a bypass exhaust plume that has an average velocity that is slower than an average velocity of the first supersonic exhaust plume.

6. A method of shock wave mitigation in supersonic vehicles, comprising:
   generating an earthward propagating wing compression shockwave from a curved wing;
   expelling a first supersonic exhaust plume having a first average velocity from an engine, the engine having an engine housing;
   moving the engine housing to meet the wing compression shockwave;
   reflecting a majority of the earthward propagating wing compression shockwave back towards the curved wing using the engine housing;
   expelling a bypass exhaust plume having a second average velocity adjacent to the first supersonic exhaust plume, the second average velocity being slower than the first average velocity; and
   inhibiting coalescence of an engine exhaust plume compression shockwave extending from the first supersonic exhaust plume using the bypass exhaust plume.

7. A method of shock wave mitigation in supersonic vehicles, comprising:
generating an earthward propagating wing compression shockwave from a curved wing;
expelling a first supersonic exhaust plume having a first average velocity from an engine, the engine having an engine housing;
moving the engine housing to meet the wing compression shockwave by translating the engine along the axis of freestream air flow about the engine;
reflecting a majority of the earthward propagating wing compression shockwave back towards the curved wing using the engine housing;
expelling a bypass exhaust plume having a second average velocity adjacent to the first supersonic exhaust plume, the second average velocity being slower than the first average velocity; and
inhibiting coalescence of an engine exhaust plume compression shockwave extending from the first supersonic exhaust plume using the bypass exhaust plume.

8. A method of shock wave mitigation in supersonic vehicles, comprising:
generating an earthward propagating wing compression shockwave from a curved wing;
expelling a first supersonic exhaust plume having a first average velocity from an engine, the engine having an engine housing;
reflecting a majority of the earthward propagating wing compression shockwave back towards the curved wing using the engine housing;
slidably moving the wing relative to a fuselage slidably coupled to the wing, wherein the wing compression shockwave is moved relative to the engine to meet the engine housing;
expelling a bypass exhaust plume having a second average velocity adjacent to the first supersonic exhaust plume, the second average velocity being slower than the first average velocity; and
inhibiting coalescence of an engine exhaust plume compression shockwave extending from the first supersonic exhaust plume using the bypass exhaust plume.

9. A method of shock wave mitigation in supersonic vehicles, comprising:
generating an earthward propagating wing compression shockwave from a curved wing toward the first supersonic exhaust plume;
expelling a first supersonic exhaust plume having a first average velocity from an engine, the engine having an engine housing;
reflecting a majority of the earthward propagating wing compression shockwave back towards the curved wing using the engine;
expelling a bypass exhaust plume having a second average velocity adjacent to the first supersonic exhaust plume, the second average velocity being slower than the first average velocity; and
inhibiting coalescence of an engine exhaust plume compression shockwave extending from the first supersonic exhaust plume using the bypass exhaust plume
wherein the curved wing has an outboard portion shape selected from the group consisting of straight and upward curving;
wherein a high-pressure underwing to freestream low pressure interface channels a sound propagating vector at an inclination to the ground and parallel to the ground, respectively.

* * * * *